April 28, 1964   H. S. VAN BUREN, JR   3,130,512
SELF-MOUNTING ORNAMENTAL DEVICE
Filed Dec. 22, 1961
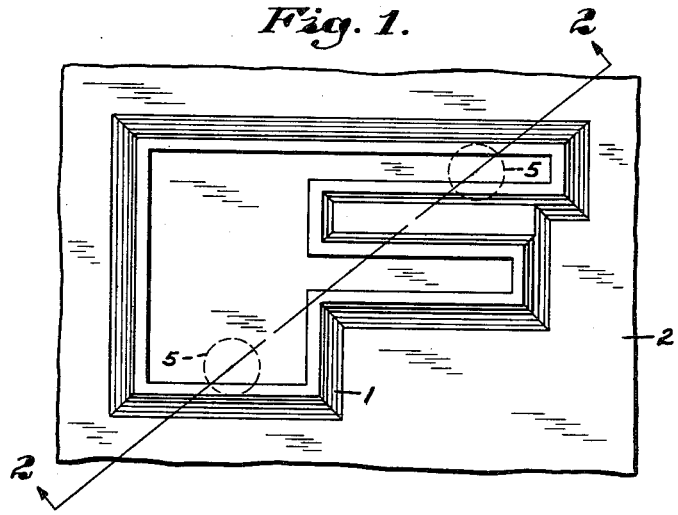
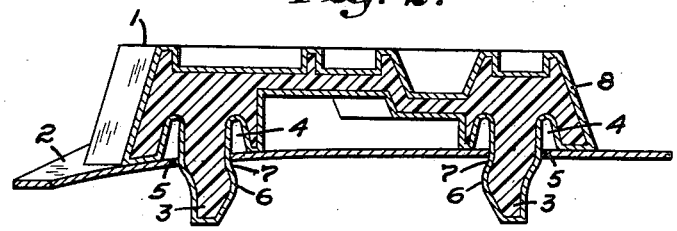
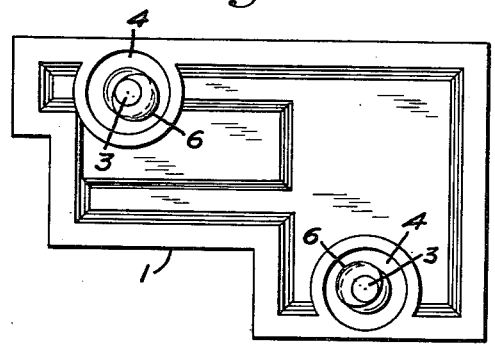
Inventor:
Harold S. van Buren Jr.,
by Walter S. Jones
Atty.

United States Patent Office 3,130,512
Patented Apr. 28, 1964

3,130,512
SELF-MOUNTING ORNAMENTAL DEVICE
Harold S. van Buren, Jr., Cambridge, Mass., assignor to United-Carr Fastener Corporation, Cambridge, Mass., a corporation of Delaware
Filed Dec. 22, 1961, Ser. No. 161,563
2 Claims. (Cl. 40—143)

This invention is directed to devices, such as letters, numerals, insignias, and other similar devices, now commonly used on motor vehicle bodies. These devices heretofore have been in the form of die castings or metalized plastics attached by bolts, nuts, or other metal fasteners.

An object of this invention is to provide a device, such a described above, which has a body portion forming the letter, or the like and having integrally formed fastening means exposed at the underside of the body portion by which the device may be snap attached to a suitable support.

Another object of the invention is to form the body portion and fastening means of injection molded, yieldable plastic material and so construct the fastening means that the device is self-attaching to the support without the use of other fastening elements other than apertures in the support. Thus the device is particularly useful for "blind" attachment to a support where the inner side is not easily accessible.

A further object of the invention is to provide a self-mounting device as a single unitary member from the same material with two or more projecting yieldable co-operating stud elements for holding the device in place by a simple snapping operation and also to prevent turning of the device relative to the support. Such a device may be of plastic material only or it may be plated plastic material depending upon its use.

In the drawings which illustrate a preferred form of the invention:

FIG. 1 is an enlarged plane view of a portion of an installation showing a single letter in place upon any suitable support;

FIG. 2 is a section taken on the line 2—2 of FIG. 1; and

FIG. 3 is a bottom plan view of the unit (in this case a letter) illustrated in FIGS. 1 and 2.

The particular form of the invention selected for illustration is in the nature of a letter 1, which may be one letter of a word, it being understood that the invention applies equally to numerals, emblems and similar devices.

This letter 1 is preferably formed as an injection molded plastic piece which is a complete single unit.

Snap fastening means is provided as a part of the unit whereby the device may be attached to a support 2, as shown in FIG 2. The protruding snap fastening means, selected to illustrate the invention, is in the form of two projecting stud portions 3 formed integrally with the body portion 1 and of the same material. Each stud portion 3 is preferably connected to the body portion at the bottom of a recess 4 (FIG. 2) so as to provide extra length for greater flexibility of the stud portions. This extra length is important in preventing breakage especially when the device is to be attached to a relatively thin support. The extra flexibility also adapts the device to substantial variations in spacing of the stud-receiving apertures 5 in the support 2. A suitable sealing compound may be added into the recesses 4 when desirable.

The stud portion 3 may be shaped in any suitable manner for snapping into engagement with the support 2, but it is preferred to provide each stud with a partial peripheral laterally projecting portion 6, each providing a partial circumferential shoulder 7, as shown in FIGS. 2 and 3. Thus the projection 6 and shoulder 7 on one stud faces the projection 6 and shoulder 7 on another stud, and they co-operate to hold the device in proper attachment with the support 2, as best shown in FIG. 2. Since at least two stud portions 3 are used on each device, the device cannot rotate relative to the support 2. This is important in lining up a series of devices or even in holding a single device in a desired predetermined position relative to a support.

The device may be used as initially manufactured from plastic material or it may be metalized as by plating with one or more metalic materials 8 (FIG. 2), as will be understood by anyone familiar with plating of plastic parts.

The base of the device may be made to fit a flat or curved support 2 depending upon the shape of the support, and in FIG. 2 this support 2 is shown as slightly curved to illustrate that feature.

It should be understood that more than two studs may be used as a part of a given device and a greater number probably would be necessary when the device is in the form of a word.

The device illustrated and described is simple, inexpensive, and preferably self-mounting on a suitable support even though the inner surface of a support is inaccessible.

While there has been illustrated and described one form of the invention, as applied to a self-mounting letter, it should be understood that the invention is best defined by the following claims.

I claim:

1. A unitary ornamental device such as a letter, said device, formed of a molded plastic material having a body portion defining a letter, number or other suitable ornament, and at least two snap fastener stud portions integral with and recessed into the undersurface of said body portion and extending from an underside of the body portion inwardly of its edges, each of said stud portions having a free terminal end, and having a laterally projecting portion providing a partial circumferential shoulder, said shoulder lying intermediate said terminal end and the mouth of said recess and said terminal end being of less diameter than the remaining length of said stud portion.

2. An ornamental assembly comprising in combination a unitary, metal coated ornamental device and a support having spaced apertures formed therethrough said ornamental device formed of a molded plastic material having a body portion defining a letter, numeral or other suitable ornament and at least two recesed snap fastener stud portions integral with and extending from an underside of the body portion inwardly of its edges, each of said stud portions having a partial peripheral, laterally projecting portion providing a partial circumferential shoulder, each of said stud portions axially engaging one of said apertures and each of said circumferential shoulders co-operating with a wall of the said aperture thereby holding said ornamental device in engagement with the support and said shoulder lying intermediate said terminal end and the mouth of said recess.

References Cited in the file of this patent

UNITED STATES PATENTS

| 2,395,197 | Schlanger | Feb. 19, 1946 |
| 2,879,614 | Baldanza | Mar. 31, 1959 |
| 3,022,591 | Faulkner | Feb. 27, 1962 |

FOREIGN PATENTS

| 1,051,695 | France | Sept. 16, 1953 |
| 1,158,170 | France | Jan. 20, 1958 |